United States Patent Office 3,076,843
Patented Feb. 5, 1963

3,076,843
FLUORINATED DERIVATIVES OF CARBOXYLIC ACID HYDRAZIDES
Francis W. Stacey, Wilmington, Del., assignor to E. I. du Pont de Nemours & Company, Wilmington, Del., a corporation of Delaware
No Drawing. Filed Mar. 31, 1960, Ser. No. 18,813
18 Claims. (Cl. 260—558)

This invention relates to a new class of fluorine-containing organic derivatives of hydrazine and to processes for preparing the same.

In spite of the continuously increasing technical interest in highly fluorinated organic compounds, there are no reports in the chemical literature of hydrazides (i.e., monoacylhydrazines) in which the nitrogen atoms bear polyfluorinated substituents. Such compounds appear to be wholly unknown.

More particularly, the new compounds of this invention are the N,N'-bis(polyfluoroalkyl)hydrazides of hydrocarbon carboxylic acids, in which hydrazides each nitrogen atom is attached to a difluoromethylene (—$CF_2$—) radical which itself is attached to a fluorine atom, a perhaloalkyl radical or an ω-hydroperhaloalkyl radical.

These new compounds thus have the generic formula (1) 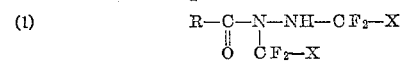

where R is hydrocarbon group; and X is selected from the group consisting of fluorine, perhaloalkyl radicals and ω-hydroperhaloalkyl radicals.

Compounds of formula 1 which are preferred, largely for economic reasons, are those wherein the hydrocarbon groups contain less than 18 carbon atoms, the perhaloalkyl radicals contain less than 13 carbon atoms each, and the ω-hydroperhaloalkyl radicals contain less than 13 carbon atoms each.

The terms used above in defining Formula 1 substituents and as elsewhere used in this application have their normal significance, i.e., perhaloalkyl means an alkyl radical containing only carbon and halogen atoms and ω-hydroperhaloalkyl means an alkyl radical containing only carbon and halogen atoms and one hydrogen atom, this hydrogen atom being at the end of the chain. Also, the term "-halo-" indicates either fluorine or chlorine atoms. For the sake of brevity, the group —$CF_2$—X will be referred to hereinafter as polyfluoroalkyl, and the class of new compounds of this invention will be referred to generically as N,N'-bis(polyfluoroalkyl)hydrazides.

Exemplary hydrocarbon groups include alkyl radicals, aryl radicals, cycloalkyl radicals, aralkyl radicals, alkaryl radicals, alkenyl radicals, alkynyl radicals, and the like.

The compounds of Formula 1 are prepared by subjecting to free radical-producing conditions an intimate mixture of an aldehyde which is hydrocarbon except for the carbonyl oxygen and a polyfluoroazoalkane having each nitrogen atom attached to a difluoromethylene radical which difluoromethylene radical itself is attached to a fluorine atom, to a perhaloalkyl or to an ω-hydroperhaloalkyl group. The reaction is represented by the following equation wherein Formula 2 is the aldehyde and Formula 3 is the polyfluoroazoalkane and wherein R and X always have their above-defined meanings:

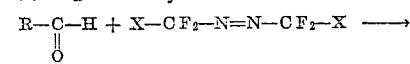

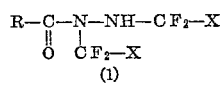

This reaction is believed to proceed by a free radical chain mechanism involving as a first step the formation of

radicals. In any event, the reaction takes place under the influence of any of the well-known free radical-generating agencies, which will be discussed in greater detail below.

In general, the aldehyde of Formula 2 above can be any aldehyde which is hydrocarbon except for the carbonyl oxygen. Thus, the hydrocarbon portion can contain ethylenic or acetylenic unsaturation. Examples of suitable aldehydes include acetaldehyde, propionaldehyde, butyraldehyde, isobutyraldehyde, n-valeraldehyde, 3-methylbutanol, trimethylacetaldehyde, n-heptaldehyde, caprylic aldehyde, pelargonic aldehyde, dodecanal, hexadecanal, octadecanal, crotonaldehyde, 2-pentenal, citronellal, citral, 2-butynal, 2-hexynal, cyclohexane-carboxaldehyde, 1-cyclohexene-1-carboxaldehyde, benzaldehyde, p-tolualdehyde, p-phenylacetaldehyde, cinnamaldehyde, and the like. The best results are obtained with aldehydes having from 2–18 carbon atoms, which are also the most readily accessible ones, and these are therefore preferred.

Similarly, in general the polyfluoroazoalkane of Formula 3 above can have any of a very wide variety of substituents in X as shown below.

Of Formula 3 compounds, that in which X is fluorine, i.e., hexafluoroazomethane, $CF_3N=NCF_3$, is a gas boiling at —32° C., which can be prepared by methods reported in the literature, of which the most convenient now known is that described in U.S. Patent 2,912,429.

The other polyfluoroazoalkanes of Formula 3 can be prepared by a process which consists in reacting, at a temperature within the range of 25 to 250° C., a nitrile of the formula X—CN, where X is a perhaloalkyl or ω-hydroperhaloalkyl radical, as defined above, with a halogen of atomic number 17–35 (chlorine or bromine) and a fluoride of a metal of the group of sodium, potassium, rubidium, cesium, copper, silver, mercury and lead. This reaction is represented by the following equation, using silver(I) fluoride and chlorine as the illustrative inorganic reactants:

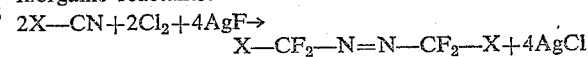

The most accessible, and therefore preferred, polyfluoroazoalkanes for use in the process of this invention are those in which X in Formula 3 is fluorine, perhaloalkyl, or ω-hydroperhaloalkyl, the alkyl portion having less than 13 carbon atoms in each instance. Thus, the polyfluoroalkyl radicals attached to the introgen atoms have from 1–13 carbon atoms each.

There are given below for guidance several examples describing in detail the preparation of representative polyfluoroazoalkanes suitable for use in the process of this invention:

A. *Perfluoroazoethane*

A mixture of 20 g. of trifluoroacetonitrile, $CF_3CN$, 75 g. of silver(I) fluoride (mole ratio $AgF/CF_3CN$ 2.8:1) and 35 g. of bromine was heated in a bomb under autogenous pressure at 100° C. for 1 hour, 150° C. for 1 hour and 190° C. for 2 hours. The volatile reaction product (30 g.) was distilled. The fraction boiling at 16–20° C. (13 g.) was found by mass spectroscopy analysis to contain, on a molar basis, 90% of perfluoroazoethane, $C_2F_5N=NC_2F_5$, 3–8% of N-bromo(perfluoroethylidene)imine, $CF_3$—$CF=NBr$, and 1% of bromopentafluoroethane, $C_2F_5Br$. The residue in the still (6 g.) was found by infrared analysis to contain 75 mol percent of perfluoroazoethane. The conversion to perfluoroazoethane was 60%. Refractionation gave essentially pure perfluoroazoethane as a yellow-green liquid boiling at 18–20° C. at 760 mm.

B. *Perfluoroazopropane*

A mixture of 30 g. of perfluoropropionitrile, $C_2F_5CN$, 75 g. of silver(I) fluoride and 40 g. of bromine was heated at 100° C. for 1 hour, then at 160° C. for 3 hours under autogenous pressure. Distillation of the volatile reaction product gave 8 g. of a yellow-green liquid, B.P. 68–71° C., which was shown by nuclear magnetic resonance and elemental analysis to be perfluoroazopropane, $C_3F_7N=NC_3F_7$.

*Analysis.*—Calc'd for $C_6F_{14}N_2$: C, 19.67; F, 72.68; N, 7.65. Found: C, 19.90; F, 71.93; N, 8.03.

There was also obtained 1 g. of N-bromo(perfluoropropylidene)imine, $C_2F_5$—CF=NBr, B.P. 55–61° C.

C. *Perfluoroazobutane*

A mixture of 30 g. of perfluorobutyronitrile, 40 g. of silver(I) fluoride (mole ratio $AgF/C_3F_7CN$ 2:1) and 20 g. of bromine was heated at 100° C. for 1 hour and 160° C. for 2 hours under autogenous pressure. Distillation of the volatile reaction product gave 8 g. of N - bromo(perfluorobutylidene)imine, $C_3F_7$—CF=NBr, B.P. 75–77° C., and 9 g. of perfluoroazobutane, $C_4F_9N=NC_4F_9$, B.P. 100–112° C. On redistillation, perfluoroazobutane was obtained as a yellow-green liquid boiling at 113° C. at 760 mm., and identified by nuclear magnetic resonance and elemental analysis.

*Analysis.*—Calc'd for $C_8F_{18}N_2$: F, 73.40. Found: F, 72.76.

When this experiment was repeated, but with different proportions of reactants (50 g. $C_3F_7CN$, 98 g. AgF, 50 g. $Br_2$, mole ratio $AgF/C_3F_7CN$ 3:1), perfluoroazobutane was the principal reaction product (84% conversion).

D. *Perfluoroazooctane*

The starting material in this example was perfluorooctanenitrile, $C_7F_{15}CN$, prepared by heating with phosphoric anhydride the ammonium salt of perfluorooctanoic acid. The acid itself was a commercial sample containing approximately 70% of $CF_3(CF_2)_6COOH$, the remainder consisting of a mixture of the isomeric acids,

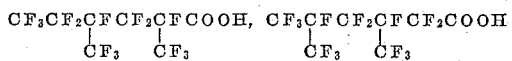

and

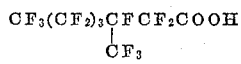

A mixture of 28 g. of perfluorooctanenitrile, 81 g. of silver(I) fluoride and 5 g. of chlorine was heated under autogenous pressure at 100° C. for 1 hour, then at 140° C. for 2 hours. The total reaction product was removed from the bomb and heated at 155° C. under 0.35 mm. pressure to recover the volatile material. There was thus obtained 22 g. of a liquid which solidified to a low melting solid. Redistillation of this product gave 20 g. (65% conversion) of a yellow-green, low melting solid boiling at 67–75° C. at 0.2 mm. pressure, which was shown by elemental analysis to be perfluoroazooctane,

*Analysis.*—Calc'd for $C_{16}F_{34}N_2$: C, 22.17; F, 74.60. Found: C, 22.31; F, 74.50.

E. *ω-Hydroperfluoroazopropane*

A mixture of 18 g. of 2,2,3,3-tetrafluoropropanenitrile, $HCF_2CF_2CN$, 60 g. of silver(I) fluoride and 11 g. of chlorine was heated at 75° C. for 1 hour and 125° C. for 1 hour under autogenous pressure. The total reaction mass was removed from the bomb and heated at 150° C. under 0.15 mm. pressure to recover the volatile reaction product. Distillation of the latter gave 2 g. of a fraction (I) boiling at 58° C. at 760 mm. and 10 g. of a fraction (II) boiling at 106–108° C. at 760 mm.

Fraction (I) was identified by nuclear magnetic resonance and elemental analysis as N-chloro(ω-hydroperfluoropropylidene)imine, $HCF_2CF_2CF=NCl$, obtained in 8% conversion.

*Analysis.*—Calc'd for $C_3HF_5ClN$: F, 52.30; Cl, 19.60. Found: F, 52.49; Cl, 18.85.

Fraction (II) was identified in the same manner as ω-hydroperfluoroazopropane, $H(CF_2)_3N=N(CF_2)_3H$, obtained in 43% conversion.

*Analysis.*—Calc'd for $C_6H_2F_{12}N_2$: F, 69.09; N, 8.49. Found: F, 68.83; N, 8.73.

F. *ω-Hydroperfluoroazopentane*

A mixture of 39 g. of ω-hydroperfluoropentanenitrile, $H(CF_2)_4CN$, 60 g. of silver(I) fluoride and 12 g. of chlorine was heated under autogenous pressure at 75° C. for 1 hour and 125° C. for 1 hour. A 17-g. liquid portion was removed from the total reaction product, and another 18-g. portion of liquid reaction product was recovered by heating the solids at 125° C. under 1–2 mm. pressure. Distillation of the combined liquids gave 11 g. of a fraction (I), a colorless liquid boiling at 100–102° C. at 760 mm., and 17 g. of a fraction (II), a yellow liquid boiling at 85–86° C. at 28 mm.

Fraction (I) was identified by nuclear magnetic resonance and elemental analysis as N-chloro-(ω-hydroperfluoropentylidene)imine, $H(CF_2)_4CF=NCl$, obtained in 23% conversion.

*Analysis.*—Calc'd for $C_5HF_9ClN$: F, 60.75; Cl, 12.61. Found: F, 60.54; Cl, 12.76.

Fraction (II) was identified in the same manner as ω-hydroperfluoroazopentane, $H(CF_2)_5N=N(CF_2)_5H$, obtained in 37% conversion.

*Analysis.*—Calc'd for $C_{10}H_2F_{20}N_2$: F, 71.70. Found: F, 71.55.

G. *3,3-Dichloro-1,1,2,2-Tetrafluoroazopropane*

A mixture of 12 g. of 3,3-dichloro-2,2-difluoropropanenitrile, $HCCl_2CF_2CN$, 54 g. of silver(I) fluoride and 6 g. of chlorine was heated under autogenous pressure at 100° C. for 1 hour and 125° C. for 1 hour. The liquid reaction product (10 g.) was recovered by heating the total reaction mass at 125–135° C. under 2 mm. pressure. Distillation of this liquid product gave 5.5 g. (37% conversion) of 3,3-dichloro-1,1,2,2-tetrafluoroazopropane, $HCCl_2CF_2CF_2N=NCF_2CF_2CCl_2H$, as a yellow-green liquid boiling at 75–79° C. at 11 mm., whose structure was confirmed by nuclear magnetic resonance and elemental analysis.

*Analysis.*—Calc'd for $C_6H_2Cl_4F_8N_2$: F, 38.38; Cl, 35.86. Found: F, 37.14; Cl, 37.88.

H. *2,2,2-Trichloro-1,1-Difluoroazoethane*

A mixture of 40 g. of trichloroacetonitrile, $CCl_3CN$, 100 g. of silver(I) fluoride and 22 g. of chlorine was heated under autogenous pressure at 75° C. for 1 hour and 125° C. for 1 hour. The volatile reaction product was recovered by heating the total reaction mass at 190° C. under 0.6 mm. pressure. There was thus obtained 33 g. of liquid which, on redistillation, gave the following fractions: (I), 4.5 g., B.P. 78–83° C.; (II), 3 g., B.P. 120–125° C.; (III), 19 g., B.P. 62.5–65° C. at 6 mm. pressure.

Fraction (I) was essentially all unreacted trichloroacetonitrile.

Fraction (II) was a pale yellow liquid, readily hydrolyzed by warm 10% aqueous sodium hydroxide. Nuclear magnetic resonance analysis showed that this product consisted essentially of N-chloro(2,2,2-trichloro-1-fluoroethylidene)imine, $Cl_3C$—CF=NCl.

Fraction (III) was a yellow-green liquid resistant to hydrolysis by warm 10% aqueous sodium hydroxide. Elemental analysis and molecular weight determination showed that this product was 2,2,2-trichloro-1,1-difluoroazoethane, $CCl_3CF_2N=NCF_2CCl_3$.

*Analysis.*—Calc'd for $C_4Cl_6F_4N_2$: Cl, 58.36; F, 20.80; M.W., 365. Found: Cl, 58.01; F, 21.10; M.W., 345.

Other suitable polyfluoroazoalkanes which can be prepared by these same general procedures include 2-chloro-1,1,2-trifluoroazoethane,
$HCFClCF_2N=NCF_2CFClH$;
2-chloro-1,1,2,2-tetrafluoroazoethane,
$ClCF_2CF_2N=NCF_2CF_2Cl$;
2,2,3,3-tetrachloro-1,1-difluoroazopropane,
$HCCl_2CCl_2CF_2N=NCF_2CCl_2CCl_2H$;
2,2,3,3,3-pentachloro-1,1-difluoroazopropane,
$CCl_3CCl_2CF_2N=NCF_2CCl_2CCl_3$;
2-chloro-1,1,2,3,3-pentafluoroazopropane,
$HCF_2CFClCF_2N=NCF_2CFClCF_2H$;
2,3-dichloro-1,1,2,3,3-pentafluoroazopropane,
$ClCF_2CFClCF_2N=NCF_2CFClCF_2Cl$;
perfluoroazoisobutane,
$(CF_3)_2CFCF_2N=NCF_2CF(CF_3)_2$;
7-hydrotrichloroundecafluoroazoheptane,
$H(CF_2CFCl)_3CF_2N=NCF_2(CF_2CFCl)_3H$;
ω-hydroperfluoroazononane,
$H(CF_2)_9N=N(CF_2)_9H$;
9-hydrooctachlorodecafluoroazononane,
$H(CF_2CCl_2)_4CF_2N=NCF_2(CF_2CCl_2)_4H$;
perfluoroazodecane,
$CF_3(CF_2)_9N=N(CF_2)_9CF_3$;
ω-hydroperfluoroazotridecane,
$H(CF_2)_{13}N=N(CF_2)_{13}H$;
and the like.

The synthesis of the compounds of Formula 1 is conducted simply by exposing a mixture of the aldehyde and the polyfluoroazoalkane to a free radical-generating source. Such sources, which are well known in the art, are of various kinds.

One free-radical generating source useful in this invention employs the various forms of ionizing radiation, which is radiation having sufficient energy to remove an electron from a gas atom, forming an ion pair. This requires energy of the order of 50 electron volts (e.v.), although energies of 100 e.v. and over are preferred for this invention.

As those skilled in the art know, ionizing radiation is generally classified in two groups; high energy particle radiation, and ionizing electromagnetic radiation. The effect produced by these two types of radiation is similar, the essential requisite being that the incident particles or photons have sufficient energy to break chemical bonds and generate free radicals. The dosage, or quantity, of radiation absorbed by the reacting system (i.e., the mixture of reactants and reaction products plus any inerts which happen to be present) should preferably be at least 100 rads. Dosages in excess of $10^4$ rads are more preferred. One rad is the quantity of radiation which results in an energy absorption of 100 ergs/gram of irradiated material. Particle radiation includes the radiation produced by streams of particles such as electrons, protons, neutrons, α-particles, deutrons, β-particles, and the like. The preferred radiation for the practice of this invention is ionizing electromagnetic radiation, such as gamma-rays or, most suitably, X-rays. It is unnecessary to enumerate the various methods of producing ionizing radiation since these methods are well known in the art.

A second source of free radicals is found in the well-known free radical-producing polymerization initiators. These include, for example, the diacyl peroxides such as diacetyl peroxide, dibutyryl peroxide, dilauroyl peroxide or dibenzoyl peroxide; the fluorinated acyl peroxides of U.S. Patent 2,559,630; the dialkyl peroxides such as diethyl peroxide, di-tert.-butyl peroxide; the persalts such as the ammonium and alkali metal persulfates, perborates and percarbonates; the azines and hydrazines, e.g., benzalazine, diphenylketazine, hydrazine hydrochloride, dibenzoyl hydrazine; the oximes, e.g., actoxime, butyraldoxime; the amine oxides, e.g., trimethylamine oxide; and the azonitriles, particularly those described in U.S. Patent 2,471,959. Such free radical-producing agents need only be added in catalytic amounts to the reacting systems of this invention, e.g., in amounts, say, between 0.001 and 0.05 mole per mole of aldehyde employed.

Yet another method of generating free radicals consists in supplying light energy to the reacting system. The light energy can be in the form of either visible light or ultraviolet light. Wavelengths in the ultraviolet range, i.e., in the range of 1800 to 3800 A. units, are preferred, although light of longer wavelengths, i.e., in the visible range, say, from 3800 to 7000 A. units can be used, especially in the presence of one of the known photopolymerization initiators such as those described in U.S. Patents 2,367,660 and 2,367,661, e.g., biacetyl, benzoin, and the like. The quantum yields will be in excess of 1. Suitable commonly available sources of visible or ultraviolet light or mixtures of them include the mercury vapor arc, tungsten bulbs of suitable intensity, sun lamps, etc.

Regardless of the source of free radicals employed, the reaction conditions used to produce the compounds of Formula 1 are not critical. When the reaction is conducted under the influence of radiant energy (particulate or wave-like), the reaction proceeds even at low temperatures, which may be as low as −50° C., though preferably in the range from 0 to 50° C. Somewhat higher temperatures, say, in the range from 50 to 150° C., are generally recommended in order to obtain a practical reaction rate when free radical-producing initiators are used. In general, it is unnecessary to exceed about 200° C. regardless of what free radical-generating source is used in order to obtain significant yields of desired products. Depending, of course, on the volatility of the individual reactants and on the particular operating temperatures employed, the reaction can be conducted at atmospheric pressures, for example, under reflux conditions, or in closed vessels under the autogenous pressures developed by the reactants.

The reaction is rapid. Appreciable formation of N,N'-bis(polyfluoroalkyl)hydrazide normally takes place in a few minutes, though in some situations one might desire to prolong contact between the reactants being exposed to free radical-generating means to a time of 6 to 8 hours or even longer. The progress of the reaction can be followed by visual inspection since the polyfluoroazoalkanes have a characteristic yellow or greenish color. Disappearance or fading of the color indicates that the addition is complete or substantially so. The reaction can, of course, be interrupted before this point is reached, if desired.

As can be seen from the reaction equation above, the reaction is theoretically a mole for mole addition of the aldehyde to the polyfluoroazoalkane but, as those skilled in the art can fully and readily appreciate, the reactants need not be used in molar proportions. An excess of one or the other can be used. In order to insure more complete utilization of the polyfluoroazoalkane, it is generally preferred to use a moderate excess of the aldehyde. Thus, there may be used a mole ratio of aldehyde to polyfluoroazoalkane ranging from about 1:1 to 10:1 conveniently, though a preferred ratio is, say, between 1.5 and 4 moles of aldehyde per mole of polyfluoroazoalkane. A slight excess of aldehyde also serves as solvent or reaction medium. If desired, an additional inert organic solvent can be used, but this is not generally necessary.

The N,N'-bis(polyfluoroalkyl)hydrazides are isolated from the reaction mixture by any conventional procedure, the simplest being fractional distillation at atmospheric or reduced pressure, since most of these products are liquid. Solid products can be separated by filtration and/or crystallization, with or without preliminary removal of excess volatile reactants, if any.

EXAMPLE I

A mixture of 17 g. of n-butyraldehyde and 13 g. of perfluoroazomethane was charged into a stainless steel cylinder of 100 ml. capacity. The mixture was irradiated with X-rays for 6 hours at an average dose rate of about 30,000 rads/minute and at ordinary room temperature of about 20° C. In this and all other examples in which X-ray irradiation was used, the X-ray source was located outside the reaction vessel, and the X-rays were generated by a 3 m.e.v. electron beam impinging on a water-cooled gold target.

The resulting liquid reaction mixture was distilled through a short fractionating column. There was obtained 15 g. (77% yield) of N,N'-bis(perfluoromethyl)-N-butyrohydrazide,

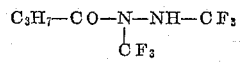

as a colorless liquid boiling at 78–79° C. at 95 mm. pressure, $n_D^{25}$ 1.3488.

*Analysis.*—Calc'd for $C_6H_8F_6N_2O$: C, 30.28; H, 3.39; F, 47.90. Found: C, 31.58; H, 3.75; F, 46.34.

The structure of the product was further confirmed by its infrared and nuclear magnetic resonance spectra.

EXAMPLE II

A mixture of 4 g. of acetaldehyde and 12 g. of perfluoroazobutane in a stainless steel cylinder of 100 ml. capacity was irradiated with X-rays for 4 hours at an average dose rate of about 20,000 rads/minute and at a temperature of about 20° C. Distillation of the reaction mixture gave 8.5 g. (67% yield) of N,N'-bis(perfluorobutyl)-N-acetohydrazide,

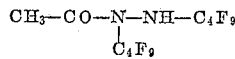

as a liquid boiling at 42° C. at 1.25 mm. pressure, $n_D^{25}$ 1.3155.

*Analysis.*—Calc'd for $C_{10}H_4F_{18}N_2O$: C, 23.46; H, 0.79; N, 5.47. Found: C, 23.80; H, 1.02; N, 5.40.

EXAMPLE III

A mixture of 7 g. of benzaldehyde and 6.5 g. of perfluoroazopropane in a stainless steel cylinder of 100 ml. capacity was irradiated at about 20° C. for 4 hours with X-rays at an average dose rate of about 30,000 rads/minute. Distillation of the reaction mixture gave 5.7 g. (65% yield) of N,N'-bis(perfluoropropyl)-N-benzohydrazide,

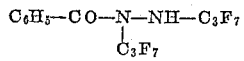

B.P. 61° C. at 1.0 mm. pressure, $n_D^{25}$ 1.3808.

*Analysis.*—Calc'd for $C_{13}H_6F_{14}N_2O$: C, 33.08; H, 1.28; N, 5.94; F, 56.35. Found: C, 34.15; H, 1.53; N, 5.99; F, 55.36.

The infrared spectrum of this compound supported the assigned structure.

EXAMPLE IV

A mixture of 20 g. of benzaldehyde, 18 g. of perfluoroazopropane and 0.5 g. of benzoyl peroxide was heated at reflux temperature (65–80° C.) for 2 hours. Reaction was complete in about 1 hour as indicated by the loss of the yellow color characteristic of the perfluoroazopropane. Fractionation of the reaction mixture gave 16.2 g. (69% yield) of N,N'-bis(perfluoropropyl)-N-benzohydrazide, B.P. 74.5–75.5° C. at 2.5 mm. pressure.

EXAMPLE V

A mixture of 8 g. of n-butyraldehyde and 10 g. of perfluoroazopropane was heated at reflux temperature (55–83° C.) for 2.5 hours. Two small portions, totaling less than 0.1 g., of benzoyl peroxide were added during the heating period. Distillation of the reaction mixture gave 9 g. (75% yield) of N,N'-bis(perfluoropropyl)-N-butyrohydrazide,

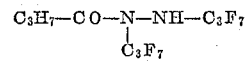

B.P. 62° C. at 8 mm. pressure, $n_D^{24}$ 1.3315.

*Analysis.*—Calc'd for $C_{10}H_8F_{14}N_2O$: F, 60.74; N, 6.40. Found: F, 59.54; N, 6.04.

EXAMPLE VI

A mixture of 2.8 g. of 2,2,2-trichloro-1,1-difluoroazoethane and 5 g. of n-butyraldehyde was placed in a glass tube, from which the air was then removed by sweeping with nitrogen. The mixture was irradiated with X-rays for 4 hours at an average dose rate of about 30,000 rads/minute and at room temperature of about 20° C. Vacuum distillation of the reaction mixture at about 0.5 mm. pressure and at a pot temperature of 120–140° C. gave a 27% yield of a liquid which was identified by its infrared spectrum as N,N'-bis(α,α'-difluoro-β,β,β-trichloroethyl)-N-butyrohydrazide,

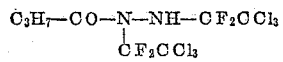

EXAMPLE VII

A mixture of 11.6 g. of ω-hydroperfluoroazopentane and 5.6 g. of n-butyraldehyde was exposed to X-rays for 3.5 hours under the conditions of Example VI. Distillation of the reaction mixture gave 7.2 g. (55% yield) of a liquid boiling at 88–90° C. at 0.55 mm. pressure, $n_D^{24}$ 1.3433, which was shown by elemental and infrared analysis to be N,N'-bis(ω-hydroperfluoropentyl)-N-butyrohydrazide,

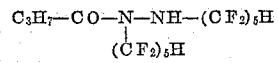

*Analysis.*—Calc'd for $C_{14}H_{10}F_{20}N_2O$: F, 62.68; N, 4.90. Found: F, 63.12; N, 4.65.

EXAMPLE VIII

A mixture of 9.4 g. of perfluoroazopropane and 8.5 g. of crotonaldehyde was exposed to X-rays for 5 hours under the condition of Example VI. Distillation of the reaction mixture gave 4.7 g. (42% yield) of a liquid boiling at 46° C. at 2.1 mm. pressure, $n_D^{24}$ 1.3416, which was shown by elemental and infrared analysis to be N,N'-bis(perfluoropropyl)-N-crotonohydrazide

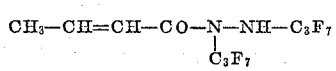

*Analysis.*—Calc'd for $C_{10}H_6F_{14}N_2O$: F, 61.23; N, 6.49. Found: F, 61.01; N, 6.43.

Applying the procedure described in the foregoing examples to other aldehydes and other polyfluoroazoalkanes leads to any other desired N,N'-bis(polyfluoroalkyl)hydrazides of hydrocarbon carboxylic acids, these compounds having the formula R—CO—N($CF_2X$)—NH—$CF_2X$, where the symbols R and X have the previously stated significance. Additional representative examples of such compounds include the following:

N,N'-bis(perfluoromethyl) - N - hexanecarbohydrazide (R=$CH_3(CH_2)_5$—, X=F).

N,N'-bis(perfluoroethyl) - N - (2,5-dimethylheptene-6)-carbohydrazide (R=$CH_2$=CH—CH($CH_3$)—($CH_2)_2$—CH($CH_3$)—$CH_2$—, X=$CF_3$—).

N,N'-bis(perfluoropentyl) - N - heptadecanecarbohydrazide (R=$CH_3(CH_2)_{16}$—, X=$C_4F_9$—).

N,N'-bis(perfluorohexyl) - N - (1 - cyclohexene)carbohydrazide $$(R=\underset{CH_2-CH_2}{\overset{CH_2-CH}{\diagup\diagdown}}C-,\ X=C_6F_{11}-)$$

N,N'-bis(perfluorooctyl)-N-crotonohydrazide $(R=CH_3-CH=CH-,\ X=C_7F_{15}-)$.

N,N'-bis(ω - hydroperfluoropropyl) - N - octanecarbohydrazide $(R=CH_3(CH_2)_7-,\ X=H(CF_2)_2-)$.

N,N'-bis(ω-hydroperfluoropropyl) - N - (1 - pentyne)-carbohydrazide $R=CH_3(CH_2)_2-C\equiv C-,\ X=H(CF_2)_2-)$ N,N'-bis(ω-hydroperfluoropentyl) - N - (1 - propyne)-carbohydrazide $(R=CH_3-C\equiv C-,\ X=H(CF_2)_4-)$.

N,N'-bis(3,3-dichloro - 1,1,2,2 - tetrafluoropropyl)-N-p-toluohydrazide $(R=CH_3C_6H_4-,\ X=HCCl_2CF_2-)$.

N,N'-bis(2,2,2 - trichloro - 1,1 - difluoroethyl)-N-isobutyrohydrazide $(R=(CH_3)_2CH-,\ X=CCl_3-)$.

N,N' - bis(2 - chloro-1,1,2,2-tetrafluoroethyl)-N-cyclohexanecarbohydrazide $$(R=\underset{CH_2-CH_2}{\overset{CH_2-CH_2}{\diagup\diagdown}}CH-,\ X=ClCF_2-)$$

N,N'-bis(2,2,3,3 - tetrachloro - 1,1 - difluoropropyl)-N-(1-naphtho)hydrazide $(R=C_{10}H_7-,\ X=HCCl_2CCl_2-)$.

N,N'-bis(perfluoroisobutyl) - N - phenylacetohydrazide $(R=C_6H_5CH_2-,\ X=(CF_3)_2CF-)$.

N,N'-bis(ω - hydroperfluorononyl) - undecanecarbohydrazide $(R=CH_3(CH_2)_{10}-,\ X=H(CF_2)_8-)$.

N,N'-bis(9-hydrooctachlorodecafluorononyl) - N - pentadecanecarbohydrazide $(R=CH_3(CH_2)_{14}-,\ X=H(CF_2CCl_2)_4-)$ N,N'-bis(perfluorodecyl)-N-cinnamohydrazide $(R=C_6H_5-CH=CH-,\ X=CF_3(CF_2)_8-)$ N,N'-bis(ω-hydroperfluorotridecyl)-N-pivalohydrazide $(R=(CH_3)_3C-,\ X=H(CF_2)_{12}-)$ Because of the greater accessibility of the reactants, the preferred products of this invention are the N,N'-bis(polyfluoroalkyl)hydrazides, in which the polyfluoroalkyl groups have from 1 to 13 carbon atoms, of hydrocarbon carboxylic acids of not more than 18 carbon atoms, i.e., the compounds of the above-given formula where X is fluorine or a perhaloalkyl or ω-hydroperhaloalkyl radical of 1–12 carbon atoms and R is a hydrocarbon radical of 1–17 carbon atoms.

The N,N'-bis(polyfluoroalkyl)hydrazides of Formula 1 are useful as solvents. These compounds have an unusual ability to dissolve highly fluorinated polymers, high molecular weight esters, and high molecular weight hydrocarbons.

When these compounds are used as solvents for highly fluorinated polymers, the solutions so obtained can be used to impregnate porous materials such as textiles, paper, wood, brick, etc., and to coat non-porous materials such as metals. For example, a solution containing about 20% by weight of low melting tetrafluoroethylene polymer (M.P. 83–105° C.) was prepared by heating a mixture of the polymer and N,N'-bis(perfluoromethyl)-N-butyrohydrazide to reflux. A strip of filter paper was partly immersed in the clear solution, then dried in air and exposed to a stream of water. The area of the strip which had been immersed in the polymer solution shed water completely and did not become wet, whereas the untreated portion of the paper became wet and soggy, demonstrating the waterproofing effect obtained by impregnation with the polymer.

The N,N'-bis(polyfluoroalkyl)hydrazides are also useful as ingredients of wax compositions in view of their ability to dissolve high molecular weight esters, e.g., beeswax, and high molecular weight hydrocarbons, e.g., paraffin. They are further useful as degreasing solvents, for example, in the cleaning of metals prior to painting, plating, etc.

In these applications, the N,N'-bis(polyfluoroalkyl)hydrazides have the great advantage that, as a class they are non-flammable and do not support combustion. In fact, many of them, e.g., N,N'-bis(perfluoropropyl)-N-butyrohydrazide, not only do not support combustion but extinguish the fire when a burning object is immersed in them.

The foregoing details description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. Compounds characterized by the formula $$\underset{\underset{CF_2-X}{|}}{R-\underset{\overset{\|}{O}}{C}-N-NH-CF_2-X}$$

where R is a hydrocarbon group having from 1 to 17 carbon atoms and X is selected from the group consisting of fluorine, perhaloalkyl radicals having from 1 to 12 carbon atoms and ω-hydroperhaloalkyl radicals having from 1 to 12 carbon atoms.

2. A compound having the formula $$\underset{\underset{CF_3}{|}}{C_3H_7-CO-N-NH-CF_3}$$

3. A compound having the formula $$\underset{\underset{C_4F_9}{|}}{CH_3-CO-N-NH-C_4F_9}$$

4. A compound having the formula $$\underset{\underset{C_3F_7}{|}}{C_6H_5-CO-N-NHC_3F_7}$$

wherein $C_6H_5$ represents phenyl.

5. A compound having the formula $$\underset{\underset{C_3F_7}{|}}{C_3H_7-CO-N-NH-C_3F_7}$$

6. A compound having the formula $$\underset{\underset{CF_2CCl_3}{|}}{C_3H_7CONNHCF_2CCl_3}$$

7. A compound having the formula $$\underset{\underset{(CF_2)_5H}{|}}{C_3H_7CONNH-(CF_2)_5H}$$

8. A compound having the formula $$\underset{\underset{C_3F_7}{|}}{CH_3-CH=CHCONNHC_3F_7}$$

9. In a process for making N,N'-bis(polyfluoroalkyl)hydrazides, the step of exposing a mixture of an aldehyde, having the formula $$R-\underset{\overset{\|}{O}}{C}-H$$

wherein R is a hydrocarbon group, with a polyfluoroazoalkane, having the formula $$X-CF_2-N=N-CF_2-X$$

where X is selected from the group consisting of fluorine, perhaloalkyl radicals and ω-hydroperhaloalkyl radicals, to a free radical-generating source comprised of free radical-producing polymerization initiators.

10. The process of claim 9 wherein the aldehyde is n-butyraldehyde and the polyfluoroazoalkane is perfluoroazomethane.

11. The process of claim 9 wherein the aldehyde is acetaldehyde and the polyfluoroazoalkane is perfluoroazobutane.

12. The process of claim 9 wherein the aldehyde is benzaldehyde and the polyfluoroazoalkane is perfluoroazopropane.

13. The process of claim 9 wherein the aldehyde is n-butyraldehyde and the polyfluoroazoalkane is perfluoroazopropane.

14. The process of claim 9 wherein the aldehyde is n-butyraldehyde and the polyfluoroazoalkane is 2,2,2-trichloro-1,1-difluoroazoethane.

15. The process of claim 9 wherein the aldehyde is n-butyraldehyde and the polyfluoroazoalkane is ω-hydroperfluoroazopentane.

16. The process of claim 9 wherein the aldehyde is crotonaldehyde and the polyfluoroazoalkane is perfluoroazopropane.

17. In a process for making N,N'-bis(polyfluoroalkyl) hydrazides, the step of exposing a mixture of an aldehyde having the formula

wherein R is a hydrocarbon group with a polyfluoroazoalkane having the formula $$X-CF_2-N=N-CF_2-X$$

wherein X is selected from the group consisting of fluorine, perhaloalkyl radicals and ω-hydroperhaloalkyl radicals, to a free radical-generating source comprised of ionizing radiation.

18. The process of claim 17 wherein said ionizing radiation comprises X-rays.

No references cited.